May 5, 1964

J. F. FOSTER ETAL 3,131,823

POWER LOADER

Filed June 23, 1960

INVENTORS
J.F. FOSTER & D.A. FINCH

BY William A. Murray

ATTORNEY

May 5, 1964  J. F. FOSTER ETAL  3,131,823
POWER LOADER
Filed June 23, 1960   3 Sheets-Sheet 2
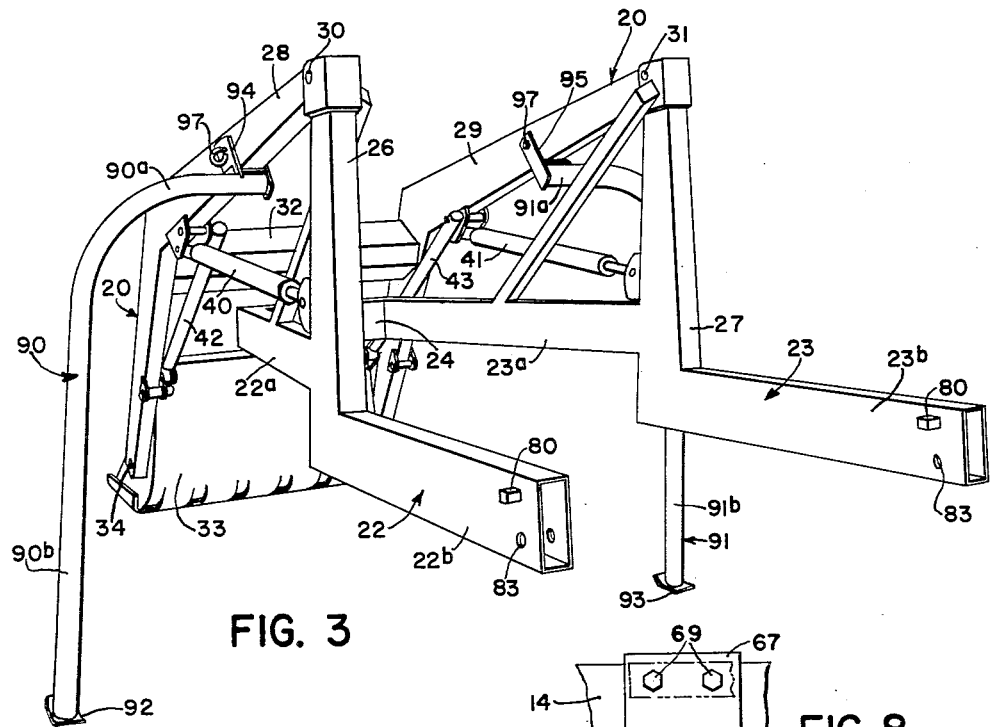
FIG. 3
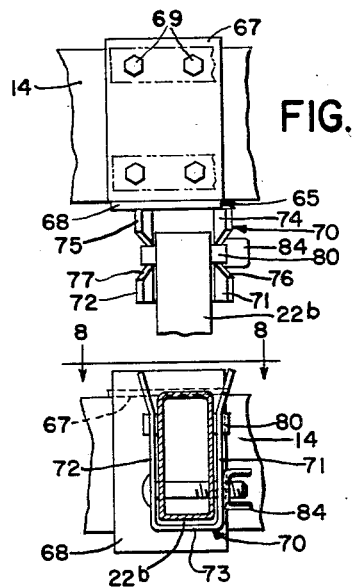
FIG. 8
FIG. 7
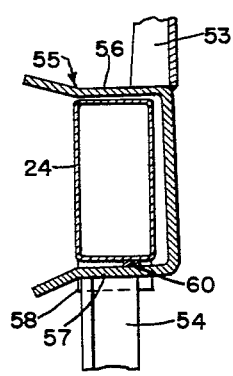
FIG. 6
INVENTORS
J. F. FOSTER & D. A. FINCH
BY *William A. Murray*
ATTORNEY

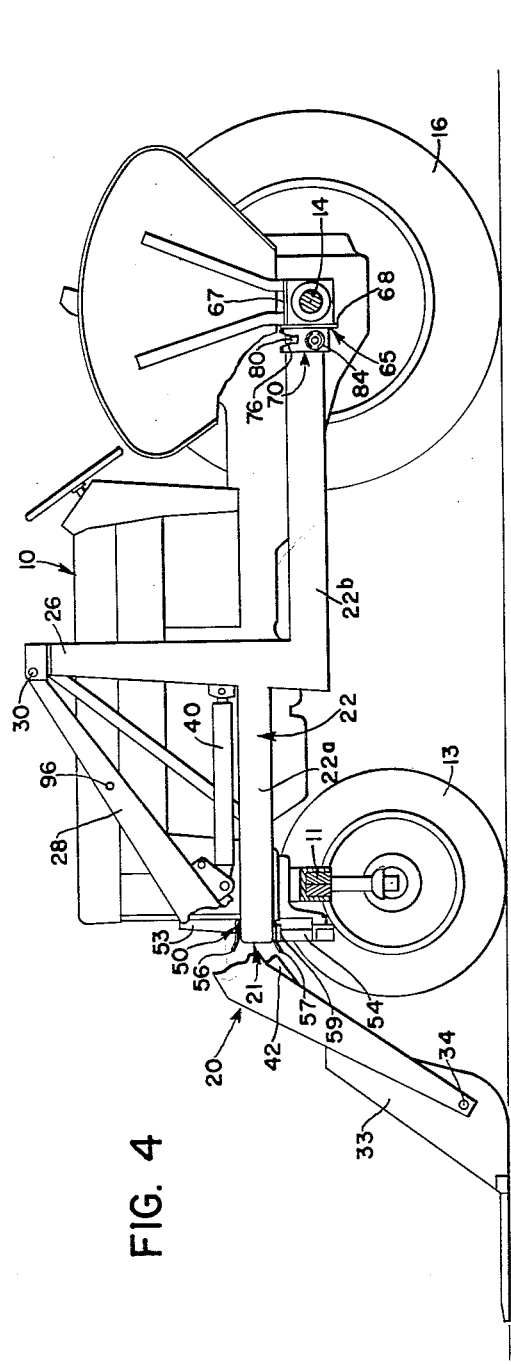
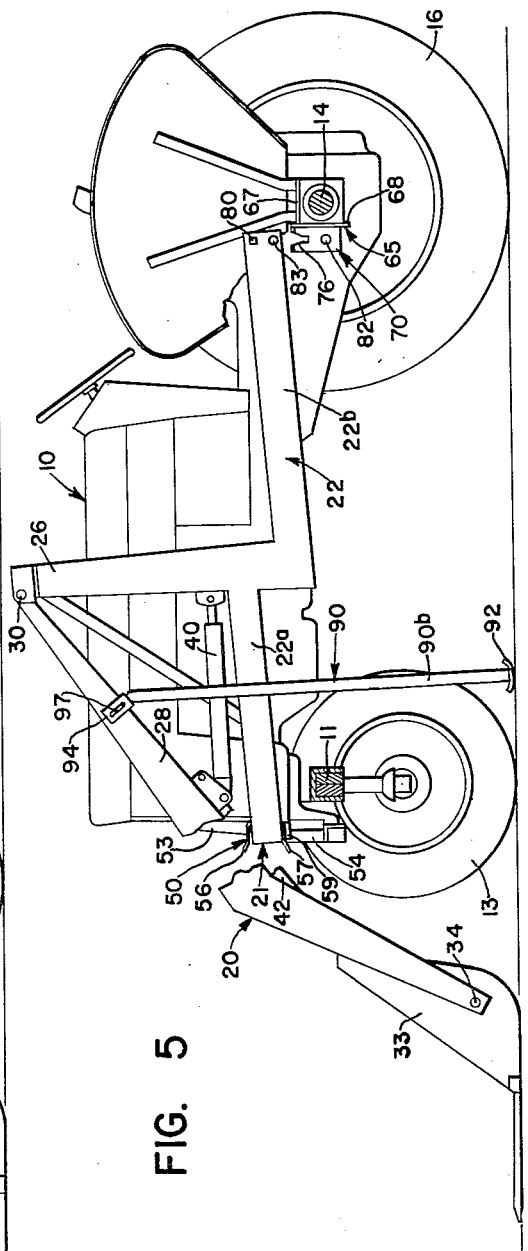
INVENTORS
J. F. FOSTER & D. A. FINCH
BY William A. Murray
ATTORNEY

United States Patent Office 3,131,823
Patented May 5, 1964

3,131,823
POWER LOADER
Jack F. Foster, Moline, and Donald A. Finch, Port Byron, Ill., assignors to Deere & Company, Moline, Ill., a corporation of Delaware
Filed June 23, 1960, Ser. No. 38,341
11 Claims. (Cl. 214—140)

This invention relates to a power loader adapted to be mounted on a tractor and more particularly to a drive-in, drive-out type of loader and its manner of being mounted on the tractor.

It is the main purpose of the present invention to provide for a power loader structure for easily mounting and dismounting the loader on and off of the tractor. In conventional type loaders, there is provided a pair of side frames which are normally attachable at their forward and rear ends to the tractor body and which support forwardly directly boom structure having load carriage means or a bucket at its forward end. In the past it has been common to supply the loader with a pair of stands which would support the loader when detached from the tractor. Normally, however, the stands offer little or no advantage in easing or speeding the burden of mounting the loader on the tractor. Consequently, the unique arrangement of structure herein to be provided for the purpose of making it easier and faster to mount and dismount the loader on and from the tractor is due partially to the construction of the loader frame, the arrangement and positioning of bracket structure on the tractor which attaches to the loader frame, and partially due to the proper positioning and proper design of the loader supporting stands.

More specifically, it is the purpose and object of the present invention to provide a loader frame having a U-shaped horizontally disposed main frame which extends around the forward end of the tractor with rearwardly directed leg portions extending to points proximate the rear tractor axle. The frame will, therefore, have a transverse beam portion extending across the forward end of the tractor. The tractor is provided with rigid forwardly extending and forwardly opening bracket structure which embraces the transverse beam from above and below, but permits the transverse beam to move freely out of the bracket structure. The axle of the tractor is provided on opposite sides of the tractor body with upwardly extending brackets with cam surfaces thereon. The rear end of the U-shaped loader frame is provided with cam engaging means engageable with the cam surfaces as the rear ends are lowered to properly position the loader frame in tractor-mounted position.

When detached from the tractor, the loader is provided with a pair of ground engaging supports or stands which are pivotally connected at their upper ends to the boom structure at a location on the boom structure closely adjacent to but slightly rearwardly of the specific center of gravity of the loader. Consequently, when detached, the loader is supported at its forward end on its carriage or bucket and at its rearward end by the supporting stand. Hydraulic cylinders extend between the loader frame and the boom structure and operate in one instance when the loader is detached from the tractor to raise and lower the supporting frame and when the loader is attached or mounted on the tractor to raise and lower the boom structure and its bucket. Consequently, when it is desired to mount the loader on the tractor, the tractor is driven forwardly until the forwardly extending bracket structure at the forward end of the tractor has received the transverse beam portion of the loader. At this point, the lift cylinders for the boom may be extended to raise the rear ends of the loader frame until they are above the vertical brackets on the axle and then by re-traction cause the rear end to seat in the cam engaging surfaces and eventually into the proper tractor-mounted position.

It is a further object of the invention to provide in connection with the forwardly directed bracket structure at the forward end of the tractor, a cooperating guide on the transverse beam of the main frame which will guide the transverse beam relative to the bracket structure to properly position the frame laterally on the tractor.

Other objects and advantages of the invention will become apparent to those skilled in the art as the nature of the invention is better understood from the following description and as shown in the accompanying drawings.

FIG. 3 is a rear perspective view taken slightly to one side showing the loader in its detached or dismounted position.

FIG. 4 is a side view of the loader and tractor with portions thereof removed for purposes of clarity.

FIG. 5 is a similar view to FIG. 4 showing the supporting stands for the loader and the loader in partially dismounted position.

FIG. 6 is a sectional view taken substantially along the line 6—6 of FIG. 2.

FIG. 7 is a section view taken substantially along the line 7—7 of FIG. 4.

FIG. 8 is a plan view of the structure shown in FIG. 7.

Figure 1:
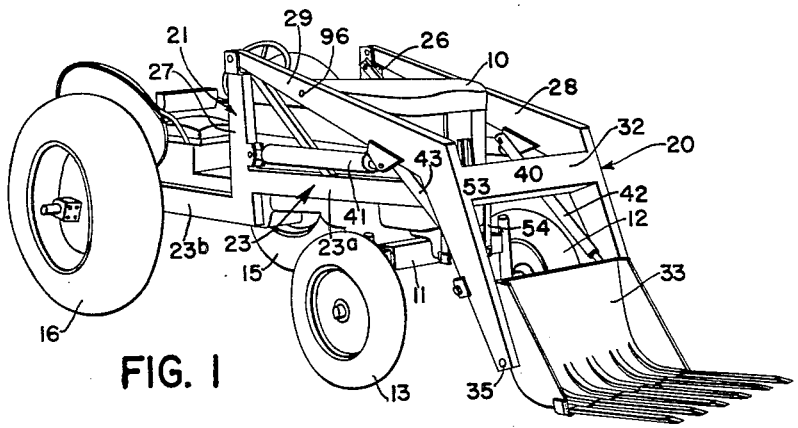
FIG. 1 is a front and side perspective view of the tractor and the loader attachment.
Figure 2:
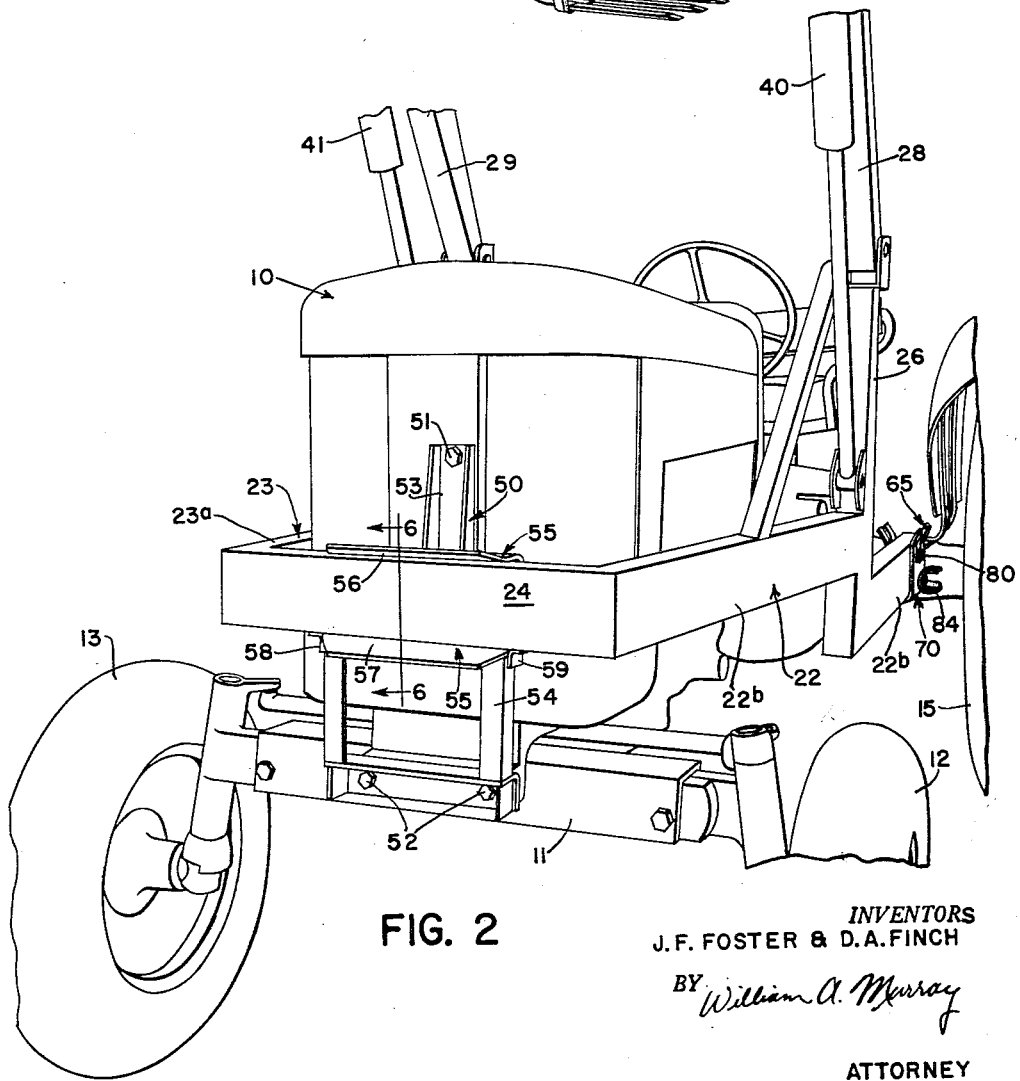
FIG. 2 is a front perspective view taken slightly to one side of the tractor showing the mounting structure on the tractor and the supporting frame for the loader.

Referring now to the drawings, there is provided a tractor having a fore-and-aft extending main body 10 carried at its forward end on transverse axle structure 11 with left- and right-hand guide wheels 12, 13 at opposite ends thereof, and supported at its rear end by transverse axle structure 14 having left- and right-hand traction wheels 15, 16. The tractor is of conventional type having an operator's station thereon and provided with a conventional type hydraulic system which may be utilized for various purposes of operating the attached implements. As may be seen from viewing the various figures, the wheels 12, 13, 15, 16 are spaced transversely from the tractor body 10 and the tractor is of the type commonly referred to in the trade as a four-wheel type tractor.

A loader, indicated in its entirety by the reference numeral 20, is provided with a U-shaped main frame 21 having fore-and-aft extending side beams 22, 23 positioned on opposite sides of the tractor and extending from a forward end slightly forward of the front end of the tractor body 10 to rear ends proximate the rear axle structure 14. The forward ends of the side beams 22, 23 are rigidly interconnected by a transverse beam 24 normally disposed across the forward end of the tractor body 10. Each of the side beams 22, 23 are provided with forward beam portions 22a, 23a and rear beam portions 22b, 23b. Midway between the front and rear ends of the side beams 22, 23 there are provided upright posts 26, 27 rigid with and interconnecting the front and rear portions 22a, 22b and 23a, 23b of the side beams. Forwardly extending booms 28, 29 are pivotally mounted at 30, 31 respectively to the upper ends of the posts 26, 27. The booms 28, 29 are rigidly connected by a transverse brace 32 to form a rigid forwardly directed boom structure. The forward end of the boom structure terminates forwardly of the tractor and pivotally carries thereon a bucket or other type of load carriage 33, pivot pins at 34, 35 being provided to supply the pivotal connections.

A pair of extensible and retractable hydraulic units 40, 41 are provided between the posts 26, 27 and booms 28, 29 to effect raising and lowering of the booms 28, 29.

Hydraulic cylinders 42, 43 are also provided between the booms 28, 29 and the rear upper end of the bucket 33 and operate to tilt the bucket on the pivots 35, 34.

Bracket structure, here indicated by the reference numeral 50, is provided adjacent the forward end of the tractor body 10. The bracket structure 50 is detachably connected to the forward end of the tractor body 10 by means of an upper bolt 51 and a pair of lower bolts 52 which rigidly fix the bracket structure 50 to the forward end of the body 10 and the forward surface of the axle structure 11. The bracket structure 50 includes framework 53 depending from the bolt 51 and framework 54 extending upwardly from the bolts 52, the latter frameworks 53, 54 carry a forwardly directed U-shaped bracket 55. The U-shaped bracket 55 has upper and lower laterally extending and forwardly directed leg or plate portions 56, 57 which embrace from above and below respectively the cross beam 24 of the main frame 21. The U-shaped bracket 55 opens forwardly so that the transverse beam 24 may be free, upnless otherwise restricted, to move to or from engagement with the bracket 55. The upper plate portion 56 flares upwardly and the lower plate portion 57 flares downwardly so as to aid in guiding the transverse beam into the pocket of the U-shaped bracket 55.

The lower leg portion 57 has transverse opposite edges converging forwardly. Provided on the underside of the transverse beam 24 is a pair of depending guides or brackets 58, 59 which operate to engage the forward ends of the edges of the plate portion 57 and position the transverse beam 24 transversely relative to the body 10 as the tractor advances or drives into the U-shaped frame 21. Referring now specifically to FIG. 6, the vertical dimension of the main portion of the transverse beam 24 is considerably smaller than the vertical spacing between the plate or leg portions 56, 57. Welded to the undersurface of the transverse beam 24 and adjacent the rear upright surface of the beam 24 is a transverse horizontally disposed metal spacer or strap 60 which will lift the transverse beam 24 when seated in the U-shaped bracket 55 so that the vertical dimension of the beam 24 and the vertical dimension of the spacer or strap 60 would generally be equal, although slightly smaller, than the spacing between the plates 56, 57. Generally, therefore, the spacer 60 will prevent any large vibration between the transverse beam 24 and the plate portions 56, 57. However, there will be sufficient tolerance remaining to permit the transverse beam to roll or rock on the forward lower edge of the strap 60 so that the rear ends of the side beams 22, 23 may be raised and lowered.

Upwardly directed bracket structures 65 are provided on the rear axle structure 14 on opposite sides of the tractor body 10. The bracket structures 65 are identical and consequently description will be limited to the bracket structure 65 on the right side of the axle 14. The bracket structure 65 is supported on the axle structure 14 by means of an inverted L-shaped frame including a laterally extending plate 67 which lies on top of the axle structure 14 and a vertically disposed plate 68 which lies against the front surface of the axle structure 14. The L-shaped frame is detachably mounted on the axle structure 14 by means of bolts 69. Welded to the front surface of the vertical plate 68 is a U-shaped upwardly opening bracket 70. The U-shaped bracket 70 has transversely spaced leg portions 71, 72 extending upwardly from a lower horizontally disposed bight portion 73. As may be readily ascertained from viewing the figures, the spacing between the leg portions 71, 72 is such as to receive between them the rear end of the side beam 23. The upper ends of the vertical leg or side portions 71, 72 are flared outwardly at 74, 75 to operate as guides for the rear end of the beam 23 and relative to guiding the beam into the U-shaped bracket 70. Also, the upper ends of the leg portions 71, 72 are provided with upwardly opening notches or cams 76, 77 having upwardly diverging and inclined edges. The rear ends of the side beam portions 22b, 23b are provided with laterally extending lugs, as at 80, which engage the aforesaid notches and, upon the rear ends being driven downwardly into the notches 76, 77 will cause the main frame 21 to position itself fore-and-aft to proper tractor-mounted position. The flared flanges 74, 75 will cause the rear end of the beam portion 23b to be properly positioned transversely relative to the tractor body 10. The vertical leg or side portions 71, 72 are provided with transversely alined openings, as at 82, which are registrable with opening 83 in the beam 23, so as to receive suitable transverse bolts and hand-adjusting nut combinations 84. The latter operates as detachable means for fixing the loader frame in position on the tractor body 10.

Referring now to FIGS. 3 and 5, there is provided as attachments for the loader a pair of L-shaped supporting stands or supports 90, 91 having upper laterally disposed portions 90a, 91a with inner ends thereof disposed under the booms 28, 29 respectively and extending outwardly therefrom to vertical leg portions 90b, 91b positioned outwardly of the transverse expanse of the wheels 12, 13, 15, 16. The stands 90, 91 being L-shaped is obviously for the purpose of permitting the tractor to drive in and out from the area of the loader without contact with the supporting stands. The lower ends of the vertical leg portions 90b, 91b are provided with arcuate shaped ground engaging pads 92, 93 respectively which permit a degree of rocking on the lower ends. The inner ends of the lateral portions 90a, 91a are provided with upwardly directed U-shaped brackets 94, 95 which engage from underneath and from opposite sides the booms 28, 29. The booms 28, 29 are provided with holes, such as at 96, which receive pins, such as at 97, also extending through the U-shaped brackets 94, 95.

The loader may be mounted on and dismounted from the tractor in the following manner. Since the specific center of gravity of the loader is forward of the pins 97, the loader will normally rest on the bucket 33 and upon the stands 90, 91 when detached from the tractor. This is the position as shown in FIG. 3. Since the loader will have been dismounted from the tractor, the transverse beam 24 will normally be in vertical alinement with the opening between the forwardly directed plates 56, 57 on the forward end of the tractor. Consequently, upon driving into the loader, the beam 24 will normally slide into this area. However, at this time the loader will remain primarily supported on the bucket 33 and the supports 90, 91. Normally, since the loader has been dismounted from the tractor, the rear ends of the portions 22b, 23b will also be positioned over the brackets 65, 66 on the rear axle 14. However, should it be desired to raise or lower the rear ends, such may be accomplished by extending or retracting the hydraulic cylinders 40, 41. As previously mentioned, there is sufficient tolerance between the transverse beam 24 and the plate portions 56, 57 to permit some rocking motion about the lower strap 60. Consequently, the rear ends of the side beams may be raised and lowered without interference. However, it is necessary to first seat the transverse beam 24 between the plates 56, 57 and to position the rear ends of the side beams 22, 23 above the brackets 64, 65. At this point, by slightly retracting the cylinders 40, 41 the rear ends of the side beams 22, 23 will be caused to be lowered and to move into position of contact with the bracket structure 65, 66. The slots 76, 77 and the flared flanges 74, 75 will guide the rear ends of the side beams 22, 23 into tractor-mounted position. The bolt and nuts 84 may then be inserted and the loader frame will be positioned and locked in its tractor-mounted position. Also, it should be recognized that by extending the cylinders 42, 43 so as to tilt the forward end of the bucket 33 downwardly to thereby raise the forward end of the booms 28, 29, the rear end of the side beams 22, 23 will be caused to drop and to be seated in the U-shaped brackets 70. In either case, upon the side beams being bolted into position by the bolt and nuts 84, the stands 90, 91 may then be removed from under the booms 28, 29 and the loader is ready for operation.

In dismounting the loader from the tractor, the booms are first raised to a position in which the stands 90, 91 may be easily mounted thereon. The booms 28, 29 are then lowered to a position of support on the stands 90, 91. This will be a position in which the cylinders 40, 41 are close to complete retraction. The bolts and nuts 84 are removed from connecting the rear end of the side beams 22, 23. The hydraulic units 40, 41 are then extended slightly and since the loader is overbalanced at its forward end, the bucket 33 will tend to drop and the rear ends of the side beams 22, 23 will rise out of the U-shaped brackets 65, 66 on the axle structure 14. At this point the tractor may be backed out from contact with the loader.

While only one form of the invention has been shown, it should be recognized that other forms and variations will occur to those skilled in the art. Therefore, while the present disclosure was shown in concise and detailed manner for the purposes of completely and concisely illustrating the principles of the invention, it was not the intention to limit or narrow the invention beyond the broad concepts set forth in the appended claims.

What is claimed is:

1. A drive-in, drive-out type of power loader for a tractor having a fore-and-aft extending body with front and rear ends supported on traction means, the latter including transverse axle structure extending to opposite sides of the tractor body, said loader comprising: a U-shaped rigid frame having laterally extending side beams extending for disposition on opposite sides of the tractor body from rear ends adjacent the axle structure to forward ends normally extending forwardly of the tractor body, said side beams being rigidly interconnected by a transverse beam portion closely adjacent and across the front end of the tractor body, each of said side beams having a vertical post thereon between the front and rear end; forwardly projecting load carrying boom structure pivoted to the posts and having a load carriage forward of the tractor; extensible hydraulic means extending between the U-shaped frame and boom structure for raising and lowering the boom structure; upper and lower laterally disposed bracket structure adapted for rigid support on the forward end of the tractor and extending and opening forwardly to receive the transverse beam portion; vertical bracket structure adapted for rigid support on the axle structure, said vertical bracket structure having upwardly inclined cam surfaces; cam engaging means on the rear ends of the side beams engageable with the respective cam surfaces upon downward movement of the rear ends and effecting fore-and-aft positioning of the latter in proper tractor-mounted position; releasable fastener means for connecting said frame rear ends to the vertical bracket structure; and ground engaging upright stands on opposite sides of the frame and detachably connected at their upper ends to the boom structure at points thereon closely to but rearwardly of the specific center of gravity of the loader whereby the loader will be slightly overbalanced forwardly of the stands and said boom structure will support the loader on the forward load carriage and the stands when detached from the tractor, and said hydraulic units may effect raising and lowering of the rear ends of the side beams.

2. A drive-in, drive-out type of power loader for a tractor having a fore-and-aft extending body with front and rear ends supported on traction means, the latter including transverse axle structure extending to opposite sides of the tractor body, said loader comprising: a U-shaped rigid frame having laterally extending side beams extending for disposition on opposite sides of the tractor body from rear ends adjacent the axle structure to forward ends normally extending forwardly of the tractor body, said side beams being rigidly interconnected by a transverse beam portion closely adjacent and across the front end of the tractor body, each of said side beams having a vertical post thereon between the front and rear end; forwardly projecting load carrying boom structure pivoted to the posts and having a load carriage forward of the tractor; extensible hydraulic means extending between the U-shaped frame and boom structure for raising and lowering the boom structure; upper and lower laterally disposed bracket structure adapted for rigid support on the forward end of the tractor and extending and opening forwardly to receive the transverse beam portion; vertical bracket structure adapted for rigid support on the axle structure, said vertical bracket structure having cam means thereon; cam engaging means on the rear ends of the side beams engageable with the respective cam means upon downward movement of the rear ends and effecting positioning of the latter in proper tractor-mounted position; releasable fastener means for connecting said frame rear ends to the vertical bracket structure; and ground engaging upright stands on opposite sides of the frame and detachably connected at their upper ends of the boom structure at points thereon closely to but rearwardly of the specific center of gravity of the loader whereby the loader will be slightly overbalanced forwardly of the stands and said boom structure will support the loader on the forward load carriage and the stands when detached from the tractor, and said hydraulic units may effect raising and lowering of the rear ends of the side beams.

3. A drive-in, drive-out type of power loader for a tractor having a fore-and-aft extending body with front and rear ends supported on traction means, the latter including transverse axle structure extending to opposite sides of the tractor body, said loader comprising: a U-shaped rigid frame having laterally extending side beams extending for disposition on opposite sides of the tractor body from rear ends adjacent the axle structure to forward ends normally extending forwardly of the tractor body, said side beams being rigidly interconnected by a transverse beam portion closely adjacent and across the front end of the tractor body, each of said side beams having a vertical post thereon; forwardly projecting load carrying boom structure pivoted to the posts and having a pivotally mounted load carriage forward of the tractor; extensible hydraulic means effecting movement of the carriage; forwardly directed bracket structure adapted for rigid support on the forward end of the tractor and disposed to receive the transverse beam portion for limiting vertical movement thereof; bracket structure on opposite sides of the tractor body adapted for rigid support on the axle structure, said latter bracket structure having cam means thereon; cam engaging means on the rear ends of the side beams engageable with the respective cam means upon downward movement of the rear ends and effecting positioning of the latter in proper tractor-mounted position; releasable fastener means for connecting said frame rear ends to the bracket structure on the axle structure; and ground engaging upright stands on opposite sides of the frame connected at their upper ends to the boom structure at points thereon closely to but rearwardly of the specific center of gravity of the loader whereby the loader will be slightly overbalanced forwardly of the stands and said boom structure will support the loader on the forward load carriage and the stands when detached from the tractor, and said hydraulic units may effect raising and lowering of the rear ends of the side beams.

4. A drive-in, drive-out type of power loader for a tractor having a fore-and-aft extending body with front and rear ends supported on traction means, the latter including transverse axle structure extending to opposite sides of the tractor body, said loader comprising: a U-shaped rigid frame having laterally extending side beams extending for disposition on opposite sides of the tractor body from rear ends adjacent the axle structure to forward ends normally extending forwardly of the tractor body, said side beams being rigidly interconnected by a transverse beam portion closely adjacent and across the front end of the tractor body; forwardly projecting load carrying boom structure pivoted to the frame and having a pivotally mounted load carriage forward of the tractor; extensible hydraulic means effecting movement of the carriage; forwardly directed bracket structure adapted for rigid support on the forward end of the tractor and disposed to receive the transverse beam portion for limiting vertical movement thereof; means on opposite sides of and on the tractor body engageable with the respective rear ends of the side beams upon downward movement of the rear ends and effecting positioning of the latter in proper tractor-mounted position; releasable fastener means for connecting said frame rear ends to the tractor body; and ground engaging loader-supporting stands connected at their upper ends to opposite sides of the loader frame closely to but rearwardly of the specific center of gravity of the loader whereby the loader will be slightly overbalanced forwardly of the stands and the loader will be supported on the forward load carriage and the stands when detached from the tractor, and said hydraulic units may effect raising and lowering of the rear ends of the side beams.

5. The invention defined in claim 4 in which the load carriage is movable by means of extensible and retractable hydraulic units extending between the boom structure and the carriage and the raising and lowering of the rear end of the loader frame is effected by rocking the carriage about its pivotal connection on the boom structure.

6. The invention defined in claim 4 in which the load carriage is movable vertically by means of the boom structure being raised and lowered, and the hydraulic units are extensible and retractable hydraulically operated piston-cylinder assemblies extending between the boom structure and U-shaped frame.

7. The invention defined in claim 4 further characterized by said ground supporting stands being inverted L-shaped stands with the upper laterally extending leg portions projecting transversely outwardly from their pivotal connections to the loader frame to depending leg portions spacedly outward of the tractor body, said vertical leg being spaced sufficiently from the tractor body and said laterally extending portions being spaced sufficiently from the ground to permit the traction means of the tractor to pass beneath and inward of the stands.

8. A drive-in, drive-out type of power loader for a tractor having a fore-and-aft extending body with front and rear ends supported on traction means, the latter being carried on transverse axle structure extending to opposite sides of the tractor body, said loader comprising: a U-shaped rigid frame having laterally extending side beams extending for disposition on opposite sides of the tractor body from rear ends adjacent the axle structure to forward ends extending forwardly of the tractor body, said side beams being rigidly interconnected by a transverse beam normally closely adjacent and across the front end of the tractor body; forwardly projecting load carrying boom structure pivoted to the frame and having a load carriage forward of the tractor; forwardly directed bracket structure adapted for rigid support on the forward end of the tractor and extending and opening forwardly to receive the transverse beam as the tractor advances, said bracket structure being effective to limit vertical movement of the transverse beam but permitting shifting of the transverse beam about a horizontal axis; vertical bracket structure adapted for rigid support on the axle structure, said vertical bracket structure having upwardly inclined cam surfaces; cam engaging means on the rear ends of the side beams engageable with the respective cam surfaces upon downward movement of the rear ends and effective to position the latter in proper tractor mounted position; releasable fastener means for connecting said rear ends to the vertical bracket structure; ground engaging supports on opposite sides of the loader detachably connected at their upper ends to the boom structure at points on the boom closely to but rearwardly of the specific center of gravity of the loader whereby the loader will be slightly overbalanced forwardly of the supports whereby the loader will be supported on the forward load carriage and the supports when detached from the tractor; and extensible and retractable hydraulic units between the U-shaped frame and the boom structure whereby in one instance when the loader is detached from the tractor the hydraulic units will be effective to position the transverse beam and rear ends of the side beams into mounting position with the respective bracket structure and in a second instance when the loader is attached to the tractor the hydraulic units will be effective to raise and lower the load carriage.

9. A drive-in, drive-out type of power loader for a tractor having a fore-and-aft extending body with front and rear ends supported on traction means, the latter being carried on transverse axle structure extending to opposite sides of the tractor body, said loader comprising: a U-shaped rigid frame having laterally extending side beams extending on opposite sides of the tractor body from rear ends adjacent the axle structure to forward ends extending forwardly of the tractor body, said side beams being rigidly interconnected by a transverse beam closely adjacent and across the front end of the tractor body; forwardly projecting load carrying boom structure pivoted to the frame and having a load carriage forward of the tractor; forwardly directed upper and lower laterally disposed bracket structure rigid with the forward end of the tractor and opening forwardly to embrace from above and below the transverse beam; vertical bracket structure rigid with the axle structure; engaging means on the rear ends of the side beams engageable with the respective vertical bracket structure to prevent lateral movement of the latter and releasable fastener means for connecting said rear ends to the vertical bracket structure.

10. A drive-in, drive-out type of power loader for a tractor having a fore-and-aft extending body with front and rear ends supported on traction means, the latter being carried on transverse axle structure extending to opposite sides of the tractor body, said loader comprising: a U-shaped rigid frame having laterally extending side beams extending on opposite sides of the tractor body from rear ends adjacent the axle structure to forward ends extending forwardly of the tractor body, said side beams being rigidly interconnected by a transverse beam closely adjacent and across the front end of the tractor body; forwardly projecting load carrying boom structure pivoted to the frame and having a load carriage forward of the tractor; forwardly directed upper and lower laterally disposed bracket structure rigid with the forward end of the tractor and opening forwardly to embrace from above and below the transverse beam; and releasable fastener means for connecting said rear ends to the axle structure.

11. The invention defined in claim 10 further characterized by said bracket structure having fore-and-aft extending edges thereon and said transverse beam having engaging means thereon engageable with the edges to limit lateral movement of the beam relative to the tractor body.

References Cited in the file of this patent

UNITED STATES PATENTS

| | | |
|---|---|---|
| 2,707,907 | Lindeman | May 10, 1955 |
| 2,745,564 | Billenstein | May 15, 1956 |
| 2,827,183 | Wagner et al. | Mar. 18, 1958 |
| 2,833,432 | Foster | May 6, 1958 |
| 2,843,947 | Anderson et al. | July 22, 1958 |
| 2,927,652 | Harrington et al. | Mar. 8, 1960 |
| 2,993,608 | Womble | July 25, 1961 |
| 3,043,375 | Astrom | July 10, 1962 |

OTHER REFERENCES

Davis Model 100 Hydraulic Loader, Aug. 26, 1953, 4 pages drawings.